June 18, 1929.  W. STEFFE  1,717,813
MELTING FURNACE
Filed March 15, 1928
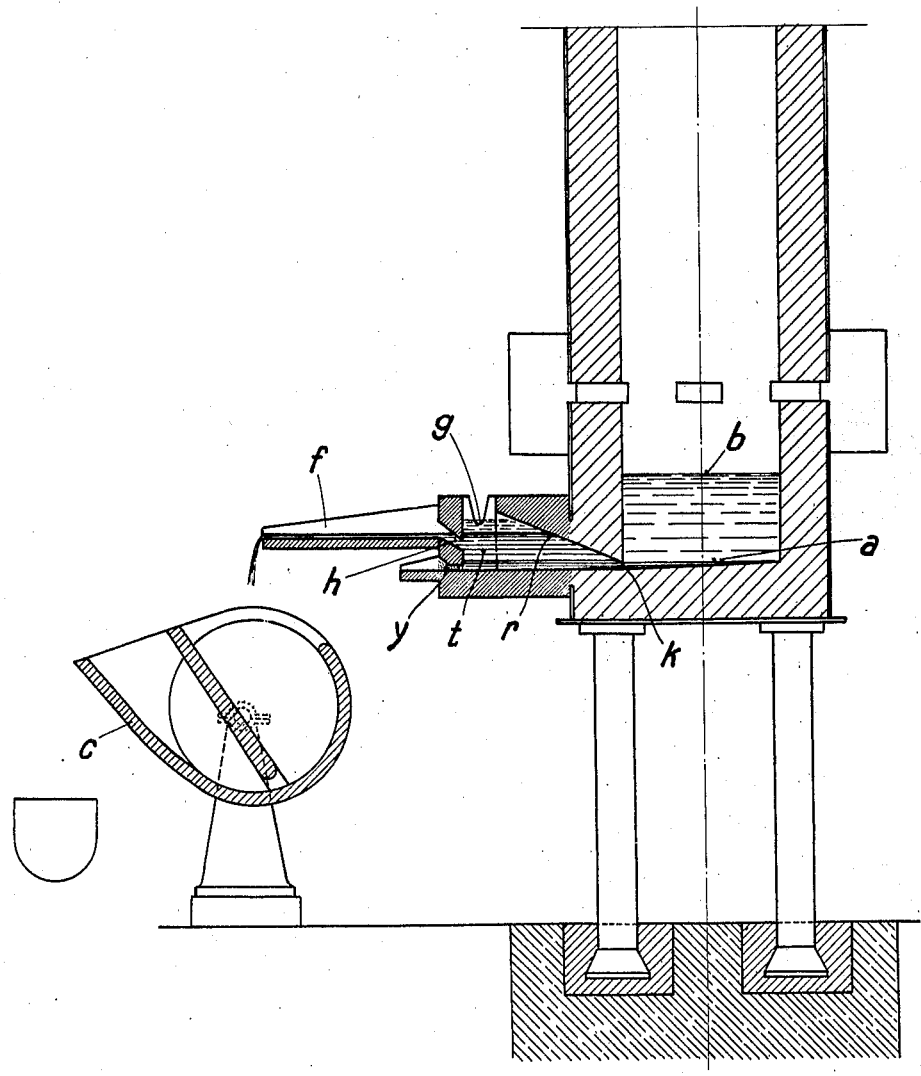
Inventor:
Wilhelm Steffe,
by W. Schoenborn,
Attorney.

Patented June 18, 1929.  1,717,813

UNITED STATES PATENT OFFICE.

WILHELM STEFFE, OF NEUNKIRCHEN, GERMANY, ASSIGNOR TO FREIER GRUNDER EISEN- UND METALLWERKE GESELLSCHAFT MIT BESCHRANKTER HAFTUNG, OF NEUNKIRCHEN, GERMANY, A COMPANY OF GERMANY.

MELTING FURNACE.

Application filed March 15, 1928, Serial No. 262,019, and in Germany July 21, 1927.

My invention relates to melting furnaces and especially to cupola furnaces, in front of which is arranged a front hearth or receiver intended to receive the molten metal and removed some distance from the furnace shaft. The object of the invention is to provide in such furnaces a simple and easily operated arrangement for continuously discharging the molten metal when the furnace is in blast, so that it is immediately withdrawn from the action of the blast and is separated from the slag. This arrangement is such moreover that the residue of the molten metal left in the furnace at the end of the operation can also be easily withdrawn through a readily accessible tapping hole.

A still further object of the invention is to force the metal and the slag through a single opening situated at the level of the furnace hearth into an open slag separator from which it can be continuously discharged at two different liquid levels; a hot and therefore fluid slag being obtained owing to the slag being drawn from the lower layer of the slag bath in the furnace shaft which is situated directly above the metal bath.

As after the column of slag in the furnace reaches a certain depth all the freshly melted slag or metal escapes immediately, the liquid level in the furnace will remain constant from that moment. The position of the melting zone situated above the liquid level will not therefore change which is an important point for obtaining a uniformly hot iron.

The oxides of the metal produced in the melting zone are reduced again in the slag column the depth of which should be at least 500 mm. and which is maintained constantly at the same level. This reduces waste. The slag escaping from the slag separator is practically free from iron and the iron discharged from the slag separator is free from slag. Owing to the purity of the iron faulty castings are avoided and desulphurizing or other refinement of the iron in the receiver is rendered possible or assisted as if there is acid furnace slag present iron cannot be desulphurized or refined. As the surface of the bath in the slag separator is not exposed to the pressure of the blast, any gases occluded in the metal can easily separate and this assists the production of a casting free from pores. Moreover as the melted metal leaves the furnace shaft at once it is possible without any difficulty to separate different alloys in one melt and owing to the continuous discharge of the molten metal the danger which is caused in other furnaces by the intermittent tapping of the metal is avoided.

Other advantages of the invention will be clear to the expert from the following description.

The accompanying drawing shows, by way of example of a construction according to the invention, the lower part of a cupola furnace with a receiver in front, in longitudinal section.

At the lowest point of the furnace hearth is provided an opening $k$ which connects the shaft with the chamber of the slag separator $t$. From the opening $k$ the roof of the chamber $t$ gradually rises and so forms the upwardly inclined conduit $r$. On the contrary, the bottom of the slag separator $t$ drops slightly from the opening $k$ down to the tapping hole $y$ which is thus connected to the opening $k$. The tapping hole $y$ can be closed in the usual manner. Close to the upper edge of the slag separator chamber $t$ is provided an outlet $g$ through which the slag is discharged; lower down is provided an outlet $h$ which rises obliquely upwards from the chamber $t$ and leads into a trough $f$. The end of the trough $f$ extends over the receiver $c$. In passing through the rising portion of the chamber $t$, the cast iron and the slag are superposed; the slag constantly flows from the layer $a$ situated directly above the iron on the furnace hearth and there is a simultaneous continuous flow of the iron. After the two masses of liquid have been separated in the chamber $t$ the slag escapes through the upper outlet $g$, and the iron flows through the obliquely rising conduit $h$ from the point near the bottom of the separation chamber, that is to say from a layer free from slag. The slag is at the same time so hot and fluid that it can be used to cast castings with sharp edges, whereas the slag which is usually drawn from the upper slag layer $b$ constantly cooled by the blast is not so hot or fluid.

The level of the outlet $g$ and the height of the highest point of the rising outlet $h$ above the opening $k$ control the depth of the liquid metal and of the slag in the slag separator, and therefore the pressure which the liquid exerts in the slag separator on the contents of the furnace. These levels are calculated in such a manner that the sum of the pressures of the liquid metal and of the slag in the slag separator is only very slightly greater than the sum of the pressures of the blast and of the slag in the furnace. The small remainder or balance of pressure required for ensuring equilibrium is supplied by the metal contained in the interior of the furnace. Owing to the smallness of this remainder, the plane of separation between the slag and iron in the cupola furnace always remains approximately below the upper edge of the opening $k$. The freshly melted metal and the freshly melted slag thus constantly flow at the same time from the furnace into the separation chamber.

When the melting is finished, the tapping hole $y$ is opened. The remainder of the metal escapes through this tapping hole from the furnace shaft and from the separation chamber. As soon as the slag appears, the hole is closed. The slag still remaining in the furnace shaft and in the conduits is drained off through the bottom valve of the furnace.

I claim:

A cupola furnace comprising a shaft and a hearth provided with an outlet at its lowest point in combination with a slag separator chamber having an inclined roof and provided with two outlets, one of said outlet being near the upper edge of the wall of said chamber and disposed above the second outlet, and also a tapping hole arranged approximately at the level of the hearth and connected to the aforesaid outlet therefrom at its lowest point in a straight line.

In testimony whereof I have affixed my signature.

WILHELM STEFFE.